United States Patent [19]

Sonoda et al.

[11] Patent Number: 4,997,409

[45] Date of Patent: Mar. 5, 1991

[54] WRAPPING TYPE TRANSMISSION STRUCTURE FOR INTERNAL COMBUSTION ENGINES

[75] Inventors: Toshinari Sonoda; Masami Hiraoka; Daisuke Horiuchi, all of Wako, Japan

[73] Assignee: Honda Giken Kogyo Kabushiki Kaisha, Tokyo, Japan

[21] Appl. No.: 476,205

[22] Filed: Feb. 7, 1990

[30] Foreign Application Priority Data

Feb. 9, 1989 [JP] Japan ................................ 1-30519

[51] Int. Cl.$^5$ ............................................. F16H 7/08
[52] U.S. Cl. ..................................... 474/101; 474/134
[58] Field of Search ....................... 474/101, 109-111, 474/113-117, 133-138, 84-89

[56] References Cited

U.S. PATENT DOCUMENTS

| | | | |
|---|---|---|---|
| 2,795,254 | 6/1957 | Hill | 474/134 X |
| 3,391,807 | 7/1968 | Buschbom | 474/134 X |
| 4,798,564 | 1/1989 | Benedict | 474/134 |
| 4,841,789 | 6/1989 | Ochiai | 474/84 |

FOREIGN PATENT DOCUMENTS 63-285228 11/1988 Japan .

Primary Examiner—Thuy M. Bui
Attorney, Agent, or Firm—Armstrong, Nikaido, Marmelstein, Kubovcik & Murray

[57] ABSTRACT

In a wrapping type transmission structure for internal combustion engines, provided with a first wrapping type transmission system which includes a first tensioner urged into press contact with a first endless power-transmitting belt and which is disposed on a side wall of an engine body, and a second wrapping type transmission system which includes a second tensioner urged into press contact with a second endless power-transmitting belt and which is disposed at a location remoter from the engine body than the first wrapping type transmission system, a support shaft is fixed to the engine body and is inserted through the first and second tensioners which are relatively movable in a plane perpendicular to the axis of the support shaft, while permitting the movements of the tensioners in directions of press contact with the first and second transmitting belts. This enables the tensioner arrangement to be compact and permits an increase in freedom for disposition of the transmission systems.

20 Claims, 14 Drawing Sheets

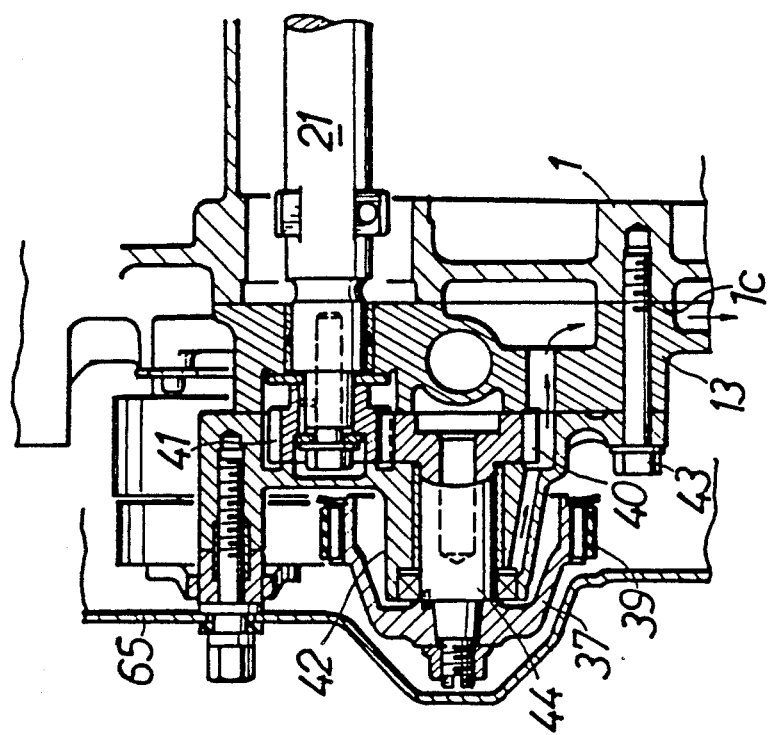
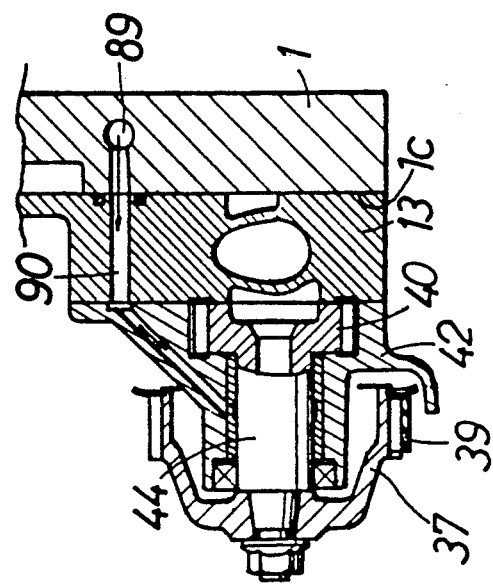
FIG.7
FIG.8

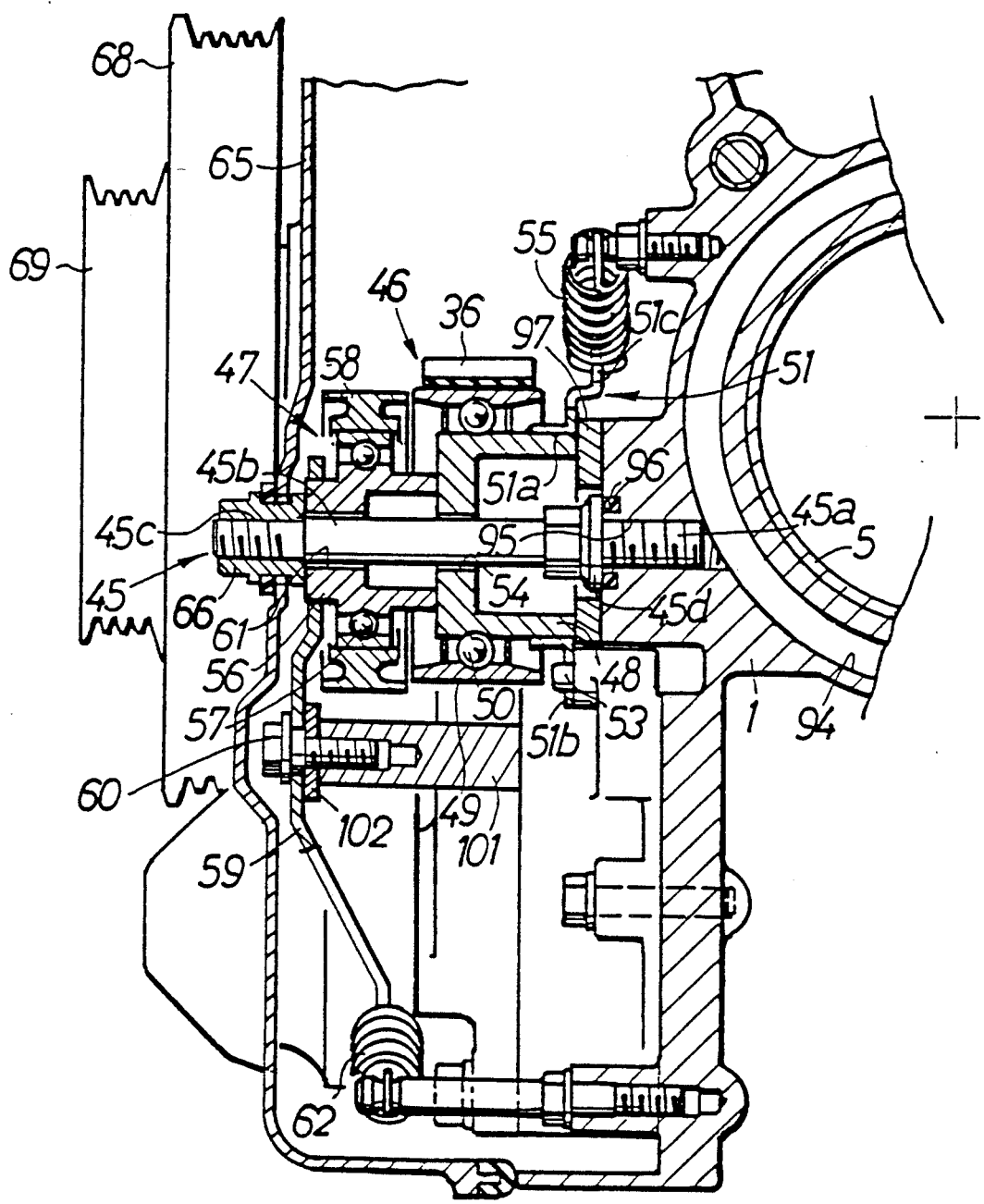

WRAPPING TYPE TRANSMISSION STRUCTURE FOR INTERNAL COMBUSTION ENGINES

BACKGROUND OF THE INVENTION

1. Field of the Invention

The field of the present invention is wrapping type transmission structures for internal combustion engines, comprising a first wrapping type transmission system which includes a first tensioner urged into press contact with a first endless power-transmitting belt and which is disposed on a side wall of an engine body, and a second wrapping type transmission system which includes a second tensioner urged into press contact with a second endless power-transmitting belt and which is disposed at a location remoter from the engine body than the first wrapping type transmission system.

2. Description of the Prior Art

Such structure is already known from, for example, Japanese Patent Application Laid-open No. 285228/88.

In the above prior art structure, the first tensioner in the first wrapping type transmission system and the second tensioner in the second wrapping type transmission system are coaxially disposed, thereby making the disposition of the tensioners compact. However, the first and second tensioners each comprise a common inner wheel and an independent outer wheel with a plurality of balls interposed between the inner and outer wheels, so that the urged movements of the first and second tensioners are guided by a support shaft inserted through the inner wheels. Therefore, the directions of movement of both the tensioners may be defined to the same direction, with a smaller freedom for disposition of the first and second wrapping type transmission systems.

SUMMARY OF THE INVENTION

The present invention has been accomplished with such circumstances in view, and it is an object of the present invention to provide a wrapping type transmission structure for internal combustion engines, wherein the disposition of two tensioners can be made compact, and the direction of urging each tensioner can be freely set.

To attain the above object, according to the present invention, a support shaft fixed to the engine body is inserted through the first and second tensioners which are relatively movable in a plane perpendicular to an axis of the support shaft, while permitting movements of the individual tensioners along directions of press contact with the first and second transmitting belts.

With the above arrangement, the first and second tensioners can be guided by the common support shaft, leading to a compactness in their disposition and moreover, the relative movement of the first and second tensioners in the plane perpendicular to the axis of the support shaft enables a free selection of the directions of urging to the corresponding transmitting belts, leading to an increase in freedom for disposition of the first and second wrapping transmission systems.

In another aspect of the present invention, the first and second tensioners respectively comprises a first and a second outer wheel urged into press contact with the first and second transmitting belts, and a first and a second inner wheel disposed coaxially with the corresponding outer wheels with a plurality of first and second rolling elements being interposed therebetween. The support shaft mounted to the engine body is inserted through first and second inner wheels, while permitting movements of the first and second tensioners in directions of press contact with the first and second transmitting belts, with an axially outer end face of the first wheel and an axially inner end face of the second inner wheel abutting against each other for relative sliding movement. A lock nut is threadedly fitted over a tip end of the support shaft projected from the second inner wheel and abutted against an axially outer end face of the second inner wheel.

In a further aspect of the present invention, a support shaft fixed to the engine body is inserted through the first and second tensioners which are relatively movable in a plane perpendicular to an axis of the support shaft and are disposed with at least portions thereof placed one on the other in an axial direction of the support shaft, while permitting movements of the first and second tensioners in directions to come into press contact with the first and second transmitting belts.

The above and other objects, features and advantages of the invention will become apparent from a reading of the following description of the preferred embodiments, taken in conjunction with the accompanying drawings.

BRIEF DESCRIPTION OF THE DRAWINGS

FIGS. 1 to 11 illustrate a first embodiment of the present invention, wherein

FIG. 1 is a longitudinal sectional view of a wrapping type transmission structure according to the first embodiment;

FIG. 2 is a view taken along a line II—II in FIG. 1;

FIG. 3 is a sectional view taken along a line III—III in FIG. 1;

FIG. 4 is a sectional view taken along a line IV—IV in FIGS. 1 and 5;

FIG. 5 is a sectional view taken along a line V—V in FIG. 3;

FIG. 6 is a sectional view taken along a line VI—VI in FIG. 3;

FIG. 7 is a sectional view taken along a line VII—VII in FIG. 3;

FIG. 8 is a sectional view taken along a line VIII—VIII in FIG. 3;

FIG. 9 is an enlarged sectional view taken along a line IX—IX in FIG. 2;

FIG. 10 is a plan view of the first tensioner; and

FIG. 11 is a sectional view taken along a line XI—XI in FIG. 10;

DESCRIPTION OF THE PREFERRED EMBODIMENTS

Figure 1:
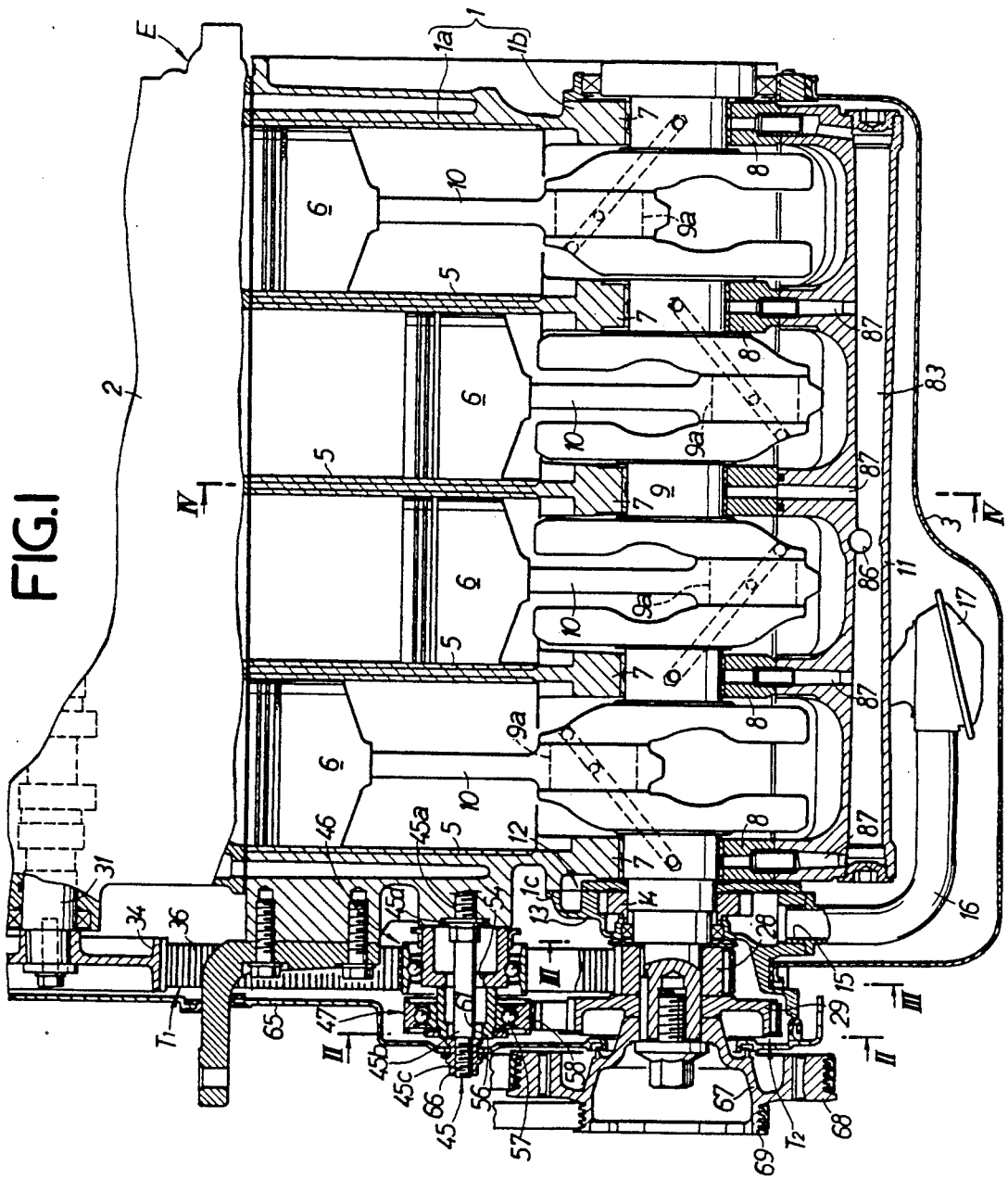
Figure 2:
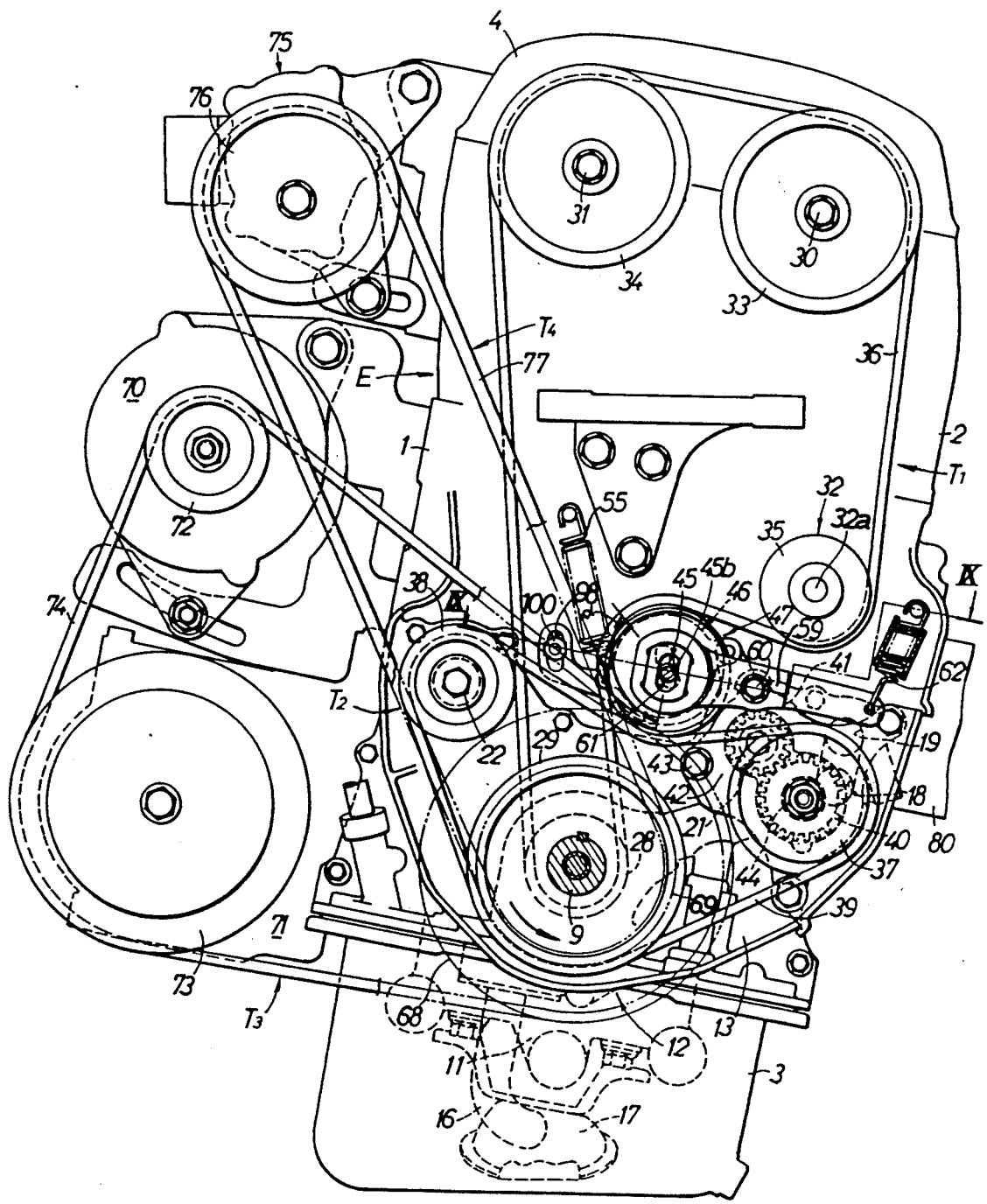
Figure 3:
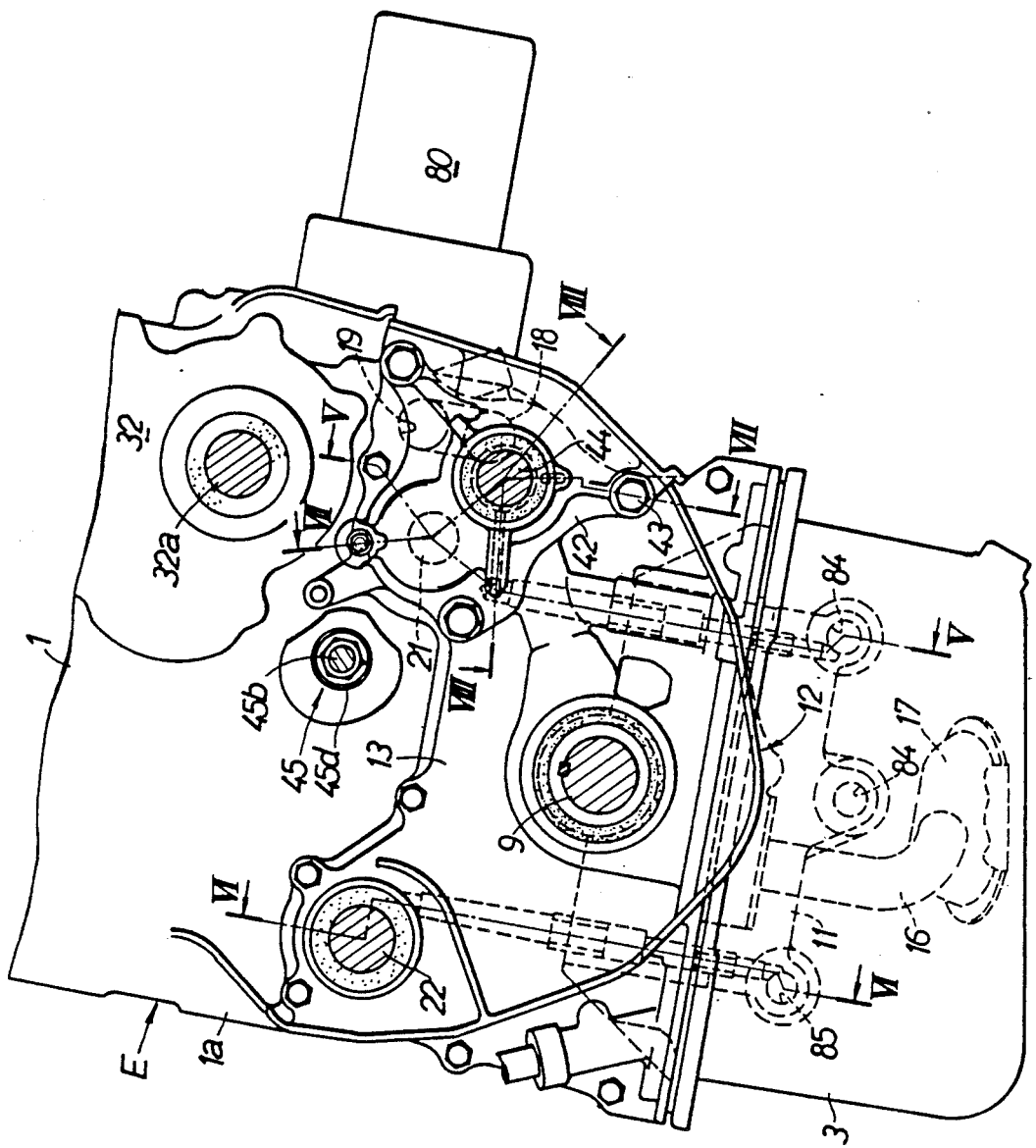
Figure 4:
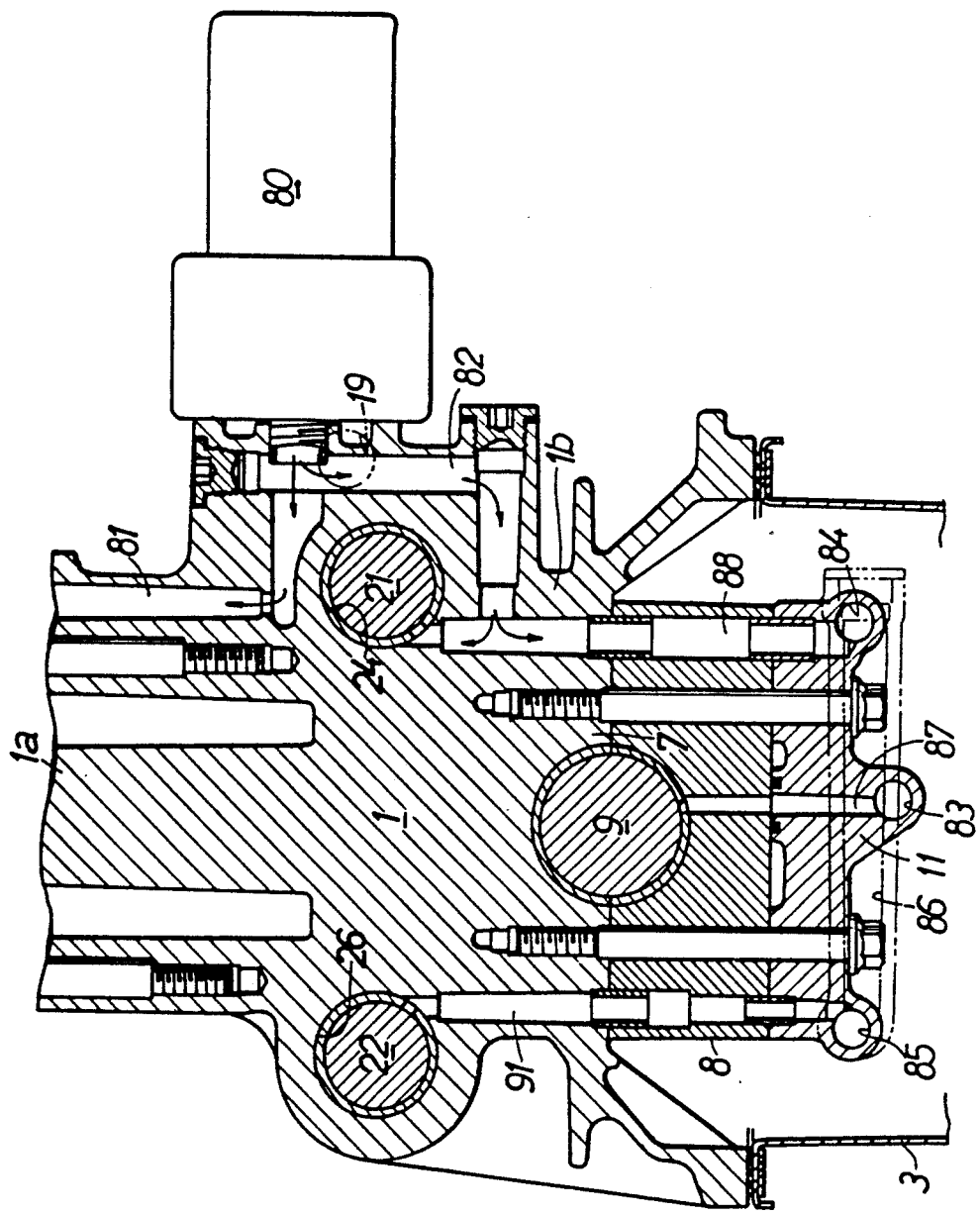

A description will hereinafter be made in conjunction with the accompanying drawings on some embodiments according to the present invention which are applied to DOHC in-line type four cylinder internal combustion engines.

A first embodiment according to the present invention will now be described with reference to FIGS. 1-11. In FIGS. 1, 2, 3 and 4, there is shown an engine body E which is constructed by joining a cylinder head 2 to an upper part of a cylinder block 1 and further with an oil pan 3 joined to a lower part of the cylinder block 1 and a head cover 4 joined to an upper part of the cylinder head 2.

The cylinder block 1 is formed of aluminum alloy and comprises an upper-half cylinder barrel portion 1a and a lower-half crankcase portion 1b. The cylinder barrel portion 1a is formed therein with four cylinder bores 5—arranged in line (which will be referred to as a first bore, a second bore, a third bore and a fourth bore in the order from the one closest to wrapping type transmission systems). Pistons 6—are slidably fitted in these cylinder bores 5—respectively. The crankcase portion 1b is formed with a plurality of journal bearings 7—disposed in the direction of arrangement of the cylinder bores 5—with spacings therebetween and a crankshaft 9 is rotatably carried between the journal bearings 7—and bearing caps 8—fixed to the lower surfaces of respective journal bearings 7. Crank pins 9a—of the crankshaft 9 are connected to the respective pistons 6—via connection rods 10. The bearing caps 8—are connected together by means of a bridge member 11.

On the side of one axial end of the crankshaft 9, there is an oil pump 12 disposed on an outer face 1c of one side wall of the cylinder block 1 so as to be driven by the crankshaft 9. This oil pump 12 comprises a pump case 13 mounted to the outer face of the one side wall of the cylinder block 1 and a rotor 14 fixed to the crankshaft 9 and accommodated in the pump case 13. The pump case 13 is provided with a suction port 15 to which is connected an oil strainer 17 via a suction conduit 16. The pump case 13 is further provided with a discharge port 18 which is connected to a lubricating oil passage 19 bored in the cylinder block 1 in parallel to the crankshaft 9. The other axial end of the crankcase 9 is projected slightly outwardly from the side wall on the other end side of the cylinder block 1 and a transmission is connected to said other end of the crankshaft 9 via a clutch not shown.

Figure 5:
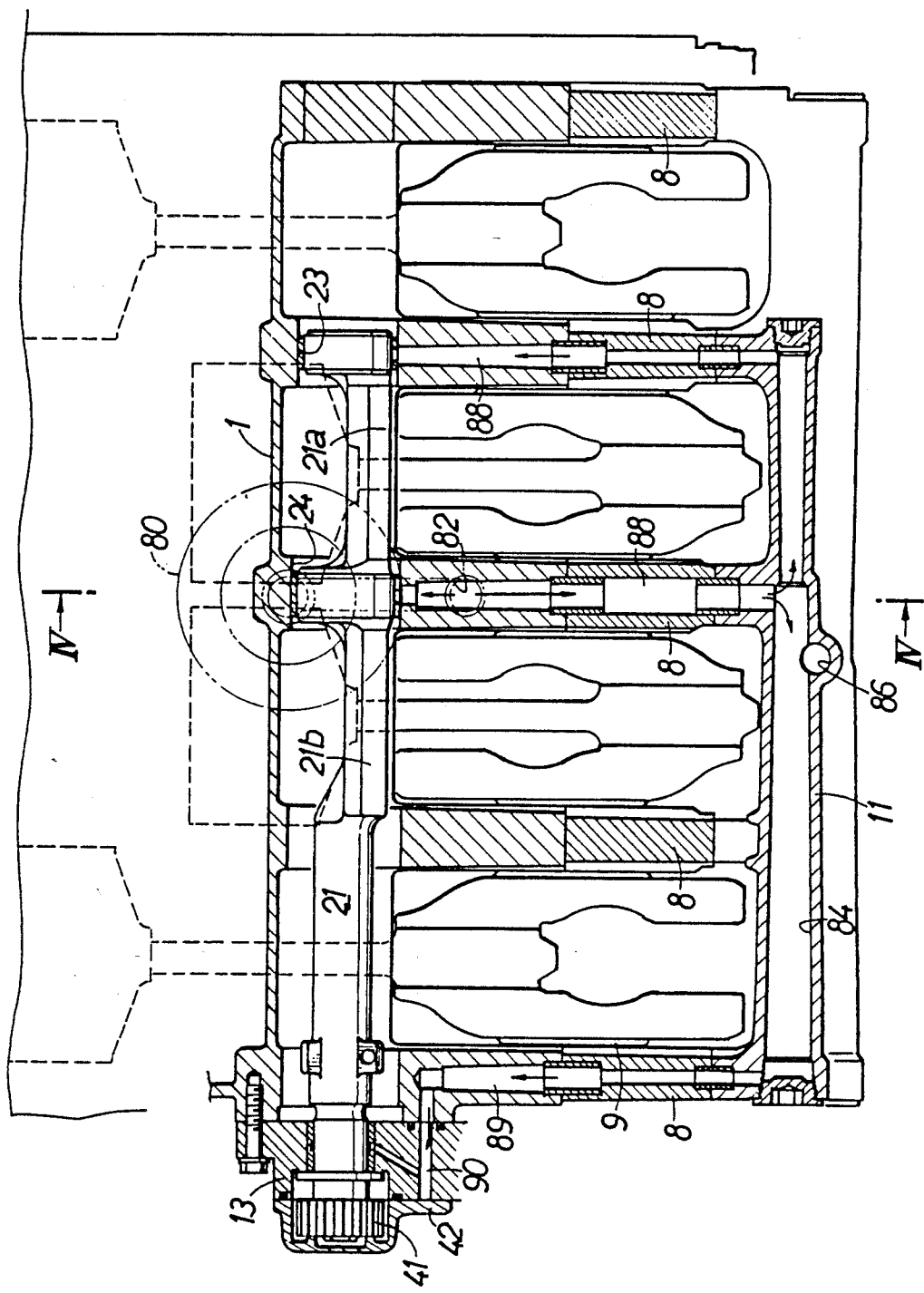
Figure 6:
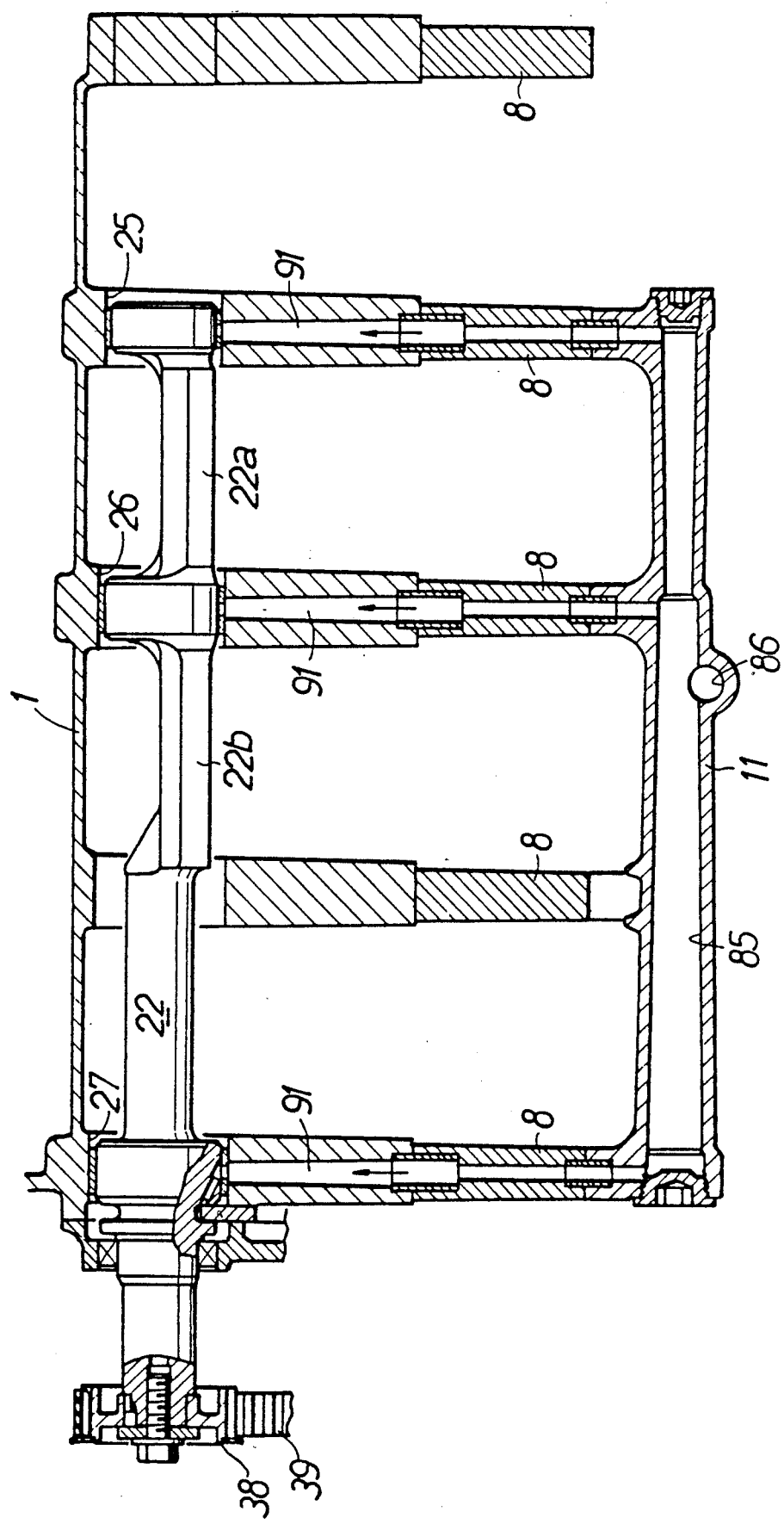

Referring also to FIGS. 5 and 6, a pair of balancer shafts 21 and 22 are rotatably disposed above and parallel to the crankshaft 9 at positions substantially symmetrical with respect to the vertical plane passing through the axis of the crankshaft 9. These balancer shafts 21 and 22 are used to suppress secondary vibration of the engine and are inserted through and disposed in the cylinder block 1 with one axial ends thereof being projected from the outer face 1c of the one side wall of the cylinder block 1. Both the balancer shafts 21 and 22 are formed at positions thereof adjacent their other axial ends with respective eccentric weight parts 21a, 21b; 22a, 22b which are distanced from each other. In the cylinder head 1, bearing holes 23 and 24 are provided, respectively, through a bulkhead portion between the third and fourth bores and through a bulkhead portion between the second and third bores for carrying thereon that part of one balancer shaft 21 which is located close to the axial other end. Likewise, bearing holes 25 and 26 for carrying that part of the other balancer shaft 22 which is located close to its axial other end and a bearing hole 27 for carrying the part of the balancer shaft 22 close to its one ends, are provided through a bulkhead portion between the third and fourth bores, a bulkhead portion between the second and third bores and through the end wall of the cylinder block 1 adjacent the first bore, respectively.

The one end of the crankshaft 9 is projected from the pump case 13 of the oil pump 12 and to this projected end of the crankshaft 9 are fixed a first drive pulley 28 of a first wrapping type transmission system T1 and a second drive pulley 29 of a second wrapping type transmission system T2, the second drive pulley 29 being positioned remoter from the cylinder block 1 than the first drive pulley 28. These drive pulleys 28 and 29 are driven for rotation in the direction shown by an arrow in FIG. 2.

The first wrapping type transmission system T1 is a timing transmission system adapted to drive an intake-side valve operating cam shaft 30 carried rotatably on the cylinder head 2 in parallel to the crankshaft 9 for driving an intake-side valve operating system, an exhaust-side valve operating cam shaft 31 carried rotatably on the cylinder head 2 in parallel to the crankshaft 9 to drive an exhaust-side valve operating system, and a water pump 32 mounted to the outer face 1c of the side wall of the cylinder block 1. This first transmission system T1 comprises the first drive pulley 28, driven pulleys 33 and 34 fixed to the cam shafts 30 and 31 for driving thereof, respectively, a driven pulley 35 fixed to a pump shaft 32a of the water pump 32 for driving thereof, and a first timing belt 36 as a first endless transmission belt wrapped around the respective pulleys 28, 33, 34 and 35.

The second wrapping type transmission system T2 is used for driving the pair of balancer shafts 21 and 22 and is arranged at a position remoter from the cylinder block 1 than the aforementioned first wrapping type transmission system T1. The second wrapping type transmission system T2 comprises the second drive pulley 29, a driven pulley 37 operatively connected with one balancer shaft 21 to drive the same for reverse rotation, a driven pulley 38 to drive the other balancer shaft 22 for normal rotation, and a second timing belt 39 as a second endless transmission belt wrapped around the respective pulleys 29, 37 and 38.

Referring also to FIGS. 7 and 8, a gear case 42 is mounted to the pump case 13 so as to cover that part of the case 13 which is located corresponding to the balancer shaft 21. In other words, the gear case 42 is, together with the pump case 13, mounted to the cylinder block 1 by bolts 43. A rotary shaft 44 is rotatably supported by the gear case 42 so as to extend parallel to the balancer shaft 21 and said driven pulley 37 used for reverse rotation drive is fixed to that end of the rotary shaft 44 which is projected from the gear case 42. Moreover, one end portion of the balancer shaft 21 is rotatably carried on the pump case 13 and is projected into the gear case 42. A gear 41 fixed to the end portion of the balancer shaft 21 and a gear 40 integrally formed on the inner end of the rotary shaft 44 are meshed with each other at a location between the pump case 13 and the gear case 42. Therefore, the driving force from the driven pulley 37 for reverse rotation drive is transmitted to the balancer shaft 21 through the medium of gears 40 and 41. Thus, the balancer shafts 21 and 22 are driven and rotated in the directions opposite to each other.

Referring also to FIG. 9, a threaded bore 95 is provided in parallel to the crankshaft 9 in the outer face 1c of the side wall of the cylinder block 1 above the crankshaft 9 to lead to a water jacket 94 provided in the cylinder block 1, and a support shaft 45 is threadedly fitted in the threaded bore 95. More specifically, the support shaft 45 comprises a shaft portion 45b coaxially connected through a radially outwardly projecting flange portion 45d to a first threaded portion 45a which is provided at a base end side and threadedly fitted in the threaded bore 95. The shaft portion 45b is provided at its leading end with a second threaded portion 45c smaller in diameter than that of the first threaded portion 45a.

The support shaft 45 is implanted in the cylinder block 1 by threadedly fitting the first threaded portion 45a into the threaded bore 95 so that the flange portion 45d abuts against the outer face 1c of the side wall. Moreover, an annular seal member 96 is interposed between the outer face 1c of the side wall and the flange portion 45d to prevent any leakage of water from the water jacket 95.

Inserted into the support shaft 45 implanted in the cylinder block 1 are a first tensioner 46 for adjusting the tension of the first timing belt 36 in the first wrapping type transmission system T1 and a second tensioner 47 for adjusting the tension of the second timing belt 39 in the second wrapping type transmission system T2.

Figure 10:
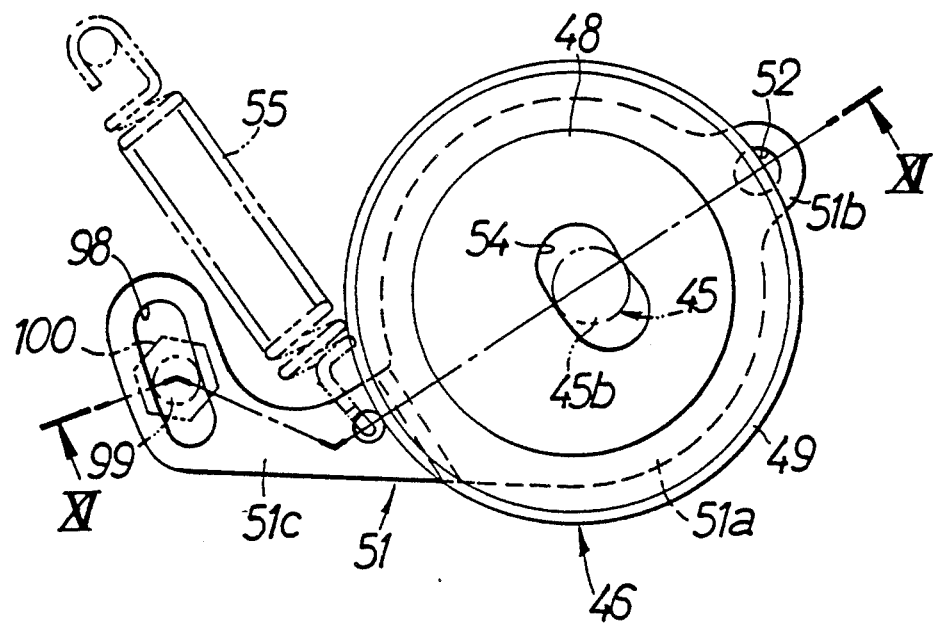
Figure 11:
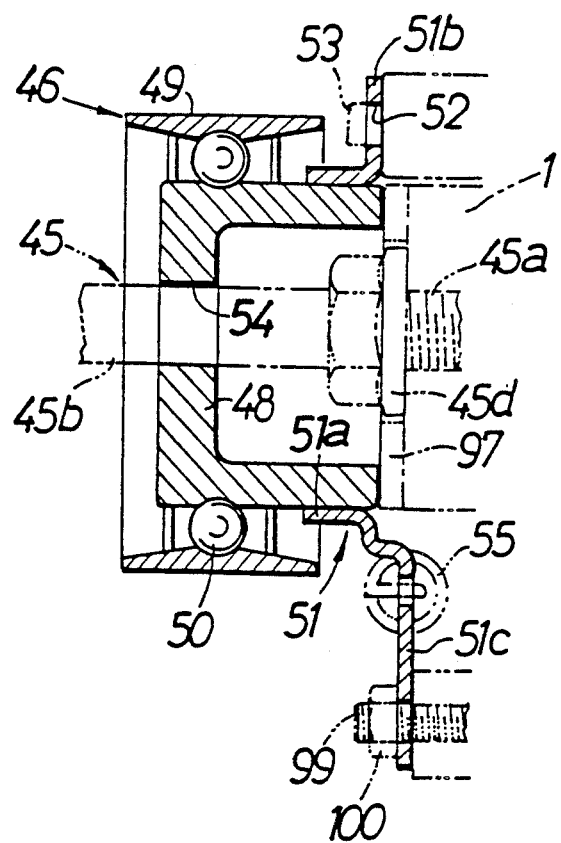

Referring to FIGS. 10 and 11, the first tensioner 46 comprises a plurality of first balls 50 as first rolling elements placed between a first inner wheel 48 and a second outer wheel 49 in press contact with an outer surface of the first timing belt 36, and is swingably carried on the cylinder block 1 through a first bracket 51.

The first inner wheel 48 is formed into a bottomed cylinderical shape opened toward the cylinder block 1, and a washer 97 is interposed between an inner or opened end face of the first inner wheel 48 and the cylinder block 1. Moreover, an axially outer end of the first inner wheel 48 is disposed at an inner side than an axially outer end face of the first outer wheel 49. The washer 97 may be formed from a material having a higher buckling strength than that of a material for forming the cylinder block 1 such as an aluminum alloy, for example, from an iron-based material.

The first bracket 51 comprises a short cylindrical body 51a press-fitted into and secured in an outer surface of the base end of the first inner wheel 48, a projection 51b projecting radially outwardly from that end of the body 51a which is close to the cylinder block 1, and an arm portion 51c located at a place substantially symmetrical to the projection 51b in respect to an axis to extend outwardly from such end of the body 51a close to the cylinder block 1. The body 51a is press-fitted into and secured in the first inner wheel 48 in such a manner that a portion of the body 51a may be contained and disposed within the first outer wheel 49 in the first tensioner 46. A support bore 52 is made in the projection 51a, so that the first bracket 51, i.e., the first tensioner 46 is swingably carried on the cylinder block 1 by insertion of a support pin 53 embedded in the cylinder block 1 through such support bore 52.

A long bore 54 arcuate about the support pin 53 is made in the axially outer or closed end of the first inner wheel 48, and the shaft portion 45b of the support shaft 45 is inserted through the long bore 54. A first tension spring 55 having one end engaged with the cylinder block 1 is engaged at the other end thereof with the arm portion 51c, so that a spring force of the first tension spring 55 causes the first outer wheel 49 of the first tensioner 46 to be urged into press contact with the first timing belt 36 from the outside thereof, thereby applying a given tension to the first timing belt 36.

A long temporarily clamping bore 98 is provided at a leading end of the arm portion 51c of the first bracket 51 along an arc about the support pin 53. On the other hand, a threaded shaft 99 is embedded in the outer surface 1c of the side wall of the cylinder block 1 and is projected outwardly through the long temporarily clamping bore 98. The swung position of the first bracket 51 and thus the first tensioner 46 can be temporarily fixed by threadedly fitting and clamping a temporarily clamping nut 100 over the threaded shaft 99.

The second tensioner 47 comprises a plurality of second balls 57 as second rolling elements placed between a second inner wheel 56 and a second outer wheel 58 in press contact with the second timing belt 39. The second inner wheel 56 is formed into a bottomed cylindrical shape opened toward the cylinder block 1, and an axially inner or opened end face of the second inner wheel 56 abuts against the axially outer end face of the first inner wheel 48 so that it may be inserted and disposed in the first outer wheel in the first tensioner 46, whereby the first and second tensioners 46 and 47 are disposed for relative sliding movement in a plane perpendicular to an axis of the support shaft 45.

A second bracket 59 is carried in the cylinder block 1 for swinging movement about an axis parallel to the crank shaft 9 and is secured to the second inner wheel 56 of the second tensioner 47. The second bracket 59 is curvedly shaped and disposed to avoid the first and second timing belts 36 and 39, so that one end thereof may be disposed in proximity to the outer surface 1c of the side wall of the cylinder block 1 with a lengthwise middle portion thereof supported on the cylinder block 1. An axially outer end of the support shaft 45 in the second inner wheel 56 of the second tensioner 47 is press-fitted into and secured in the other end of the second bracket 59.

A columnar supporting projection 101 is mounted on the outer surface 1c of the side wall of the cylinder block 1 to swingably support the second bracket 59, and the middle portion of the second bracket 59 abuts against a leading end of the supporting projection 101 through a slide plate 102. Moreover, the second bracket 59 is swingably supported by a bolt 60 passed through the second bracket 59 and the slide plate 102 and screwed into the supporting projection 101.

The second inner wheel 56 is provided at its central portion with a long bore 61 arcuate about the bolt 60, and the shaft portion 45b of the support shaft 45 is inserted through the long bore 61. Further, a second tension spring 62 is disposed between the other end of the second bracket 59 and the cylinder block 1, so that a spring force of the second tension spring 62 causes the second outer wheel 58 to be urged into press contact with the second timing belt 39 from the outside thereof, thereby applying a given tension to the second timing belt 39. The width of the second outer wheel 58 in the second tensioner 47 is set smaller than that of the first outer wheel 49 in the first tensioner 46.

Figure 9A:
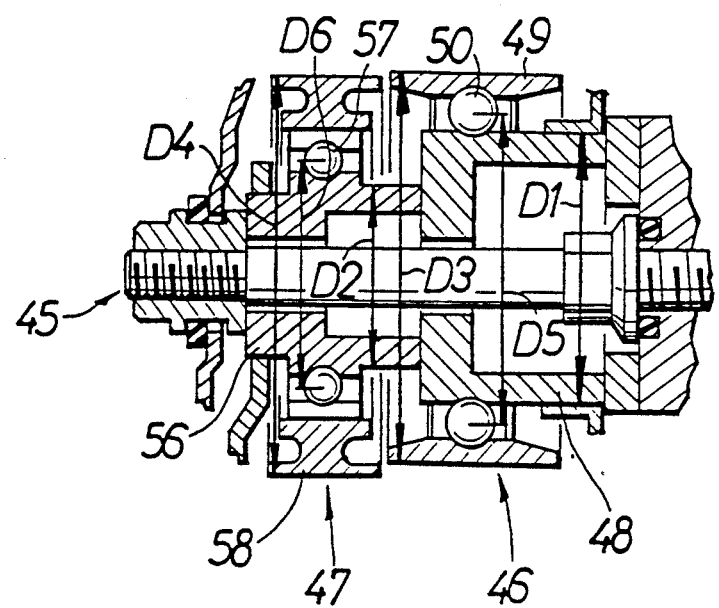
FIG. 9A is an enlarged view of an essential portion of FIG. 9 for illustrating the dimensional relationship between first and second tensioners.

Referring to FIG. 9A, outside diameter D1 of the first inner wheel 48 is set larger than the outside diameter D2 of the second inner wheel 56 (D1>D2). In addition, the ratio of the outside diameter D4 of the second outer wheel 58 to the outside diameter D2 of the second inner wheel 56 (D4/D2) is set larger than the ratio of the outside diameter D3 of the first outer wheel 49 to the outside diameter D1 of the first inner wheel 48

(D4/D2>D3/D1). On the basis of such a relationship, for example, the outside diameter D3 of the first outer wheel 49 is set smaller than the outside diameter D4 of the second outer wheel 58 (D3<D4), and the diameter D5 of a phantom circle of arrangement of the first balls 50 is set larger than the diameter D6 of a phantom circle of arrangement of the second balls 57 (D5>D6).

In such a manner, the first timing belt 36 in the first wrapping type transmission system T1 is urged inwardly from the inside at a loosened side thereof between the first drive pulley 28 and the driven pulley 35 for driving the water pump by the first tensioner 46 and thus, deeply curved inwardly, and the gear case 42 is disposed in a blank space produced by such curving. Moreover, the angle formed by a direction of urging of the first timing belt 36 by the first tensioner 46 and a direction of urging of the second timing belt 39 by the second tensioner 47 is set at 90 degrees or more, preferably 120 degrees or more.

The first and second wrapping type transmission systems T1 and T2 are surrounded by a side cover 65. The leading end of the support shaft 45 is protruded outwardly through the side cover 65, and a lock nut 66 is also protruded outwardly from the side cover 65 to enable an operation from the outside. The lock nut 66 threadedly fitted over the second threaded portion 45c at the leading end of the support shaft 45 to abut against the outer end face of the second inner wheel 56 of the second tensioner 47 is rotatably engaged with the side cover 65 in such a manner that an operating portion of the lock nut 66 is disposed outside the side cover 65, whereby the lock nut 66 can be operated for rotation from the outside of the side cover 65. Thus, the clamping of the lock nut 66 causes the inner wheels 48 and 56 of the first and second tensioners 46 and 47 to abut against each other for relative movement in a plane perpendicular to the axis of the support shaft 45.

A rotary wheel 67 projecting outwardly from the side cover 65 is secured to the crankshaft 9. The rotary wheel 67 is integrally provided with a third drive pulley 68 of a third wrapping type transmission system T3 at an axially inner side and also with a fourth pulley 69 of a fourth wrapping type transmission system T4 at an axially outer side.

The third wrapping type transmission system T3 is a transmission system for driving an AC generator 70 and a compressor 71 for an air conditioner, which are attached to the cylinder block 1. The system T3 comprises the third drive pulley 68, a driven pulley 72 secured to an input shaft of the AC generator 70 for driving the AC generator, a driven pulley 73 secured to an input shaft of the compressor 71 for the air conditioner for driving the compressor, and an endless belt 74 passed around the individual pulley 68, 72 and 73. The fourth wrapping type transmission T4 is a transmission system for driving a power steering hydraulic pump 75 mounted to the cylinder head 2 and comprises a fourth drive pulley 69, a driven pulley 76 secured to an input shaft of the hydraulic pump 75 for driving the hydraulic pump, and an endless belt 77 passed around the pulleys 69 and 76.

The construction of a lubricating oil supply system will be described below. A lubricating oil supplied from the oil pump 12 to a lubricating oil passage 19 provided in the cylinder block 1 is passed to an oil filter 80 which is mounted to the side surface of the cylinder block 1 at a place corresponding to the journal bearing 7 located between the two inner cylinder bores 5, 5 in the direction of arrangement. Moreover, the cylinder block 1 is provided with an oil passage 81 for guiding the lubricating oil from the oil filter 80 toward the upper valve operating mechanism and an oil passage 82 for guiding the lubricating oil downwardly.

On the other hand, the bridge member 11 connecting the bearing caps 8—together is provided with a central oil passage 83 corresponding to the crankshaft 9 and side oil passages 84 and 85 located at opposite sides of the central oil passage and corresponding to the balancer shafts 21 and 22, respectively, the passages 83, 84, 85 being parallel to the crankshaft 9. The bridge member 11 has a communication oil passage 86 also provided therein at the lengthwise middle of the oil passages 83 to 85 perpendicularly to the oil passages to permit the communication of them with one another.

An oil supply passage 87 is provided in each of the bridge member 11 and the bearing caps 8—to extend upwardly with its lower end in communication with the central oil passage 83 for supplying the lubricating oil to the supporting portion of the crankshaft 9. In addition, oil supply passages 88, 88 are made in the bridge member 11, the bearing cap 8 and the cylinder block 1 at locations corresponding to the bearing holes 23 and 24 in the balancer shaft 21 with their lower ends in communication with the side oil passages 84 and their upper ends in communication with the bearing holes 23 and 24. Further, an upwardly extending oil supply passage 89 is made in the bridge member 11, the bearing cap 8 and the cylinder block 1 at an axially end of the crankshaft 9 with its lower end in communication with the side oil passage 84. The oil supply passage 89 communicates with an oil supply passage 90 made in the pump case 13. The oil supply passage 90 communicates with that portion of the balancer shaft 21 which is supported on the pump case 13 and also with that portion of the rotary shaft 44 which is supported on the gear case 42. An oil supply passage 91 is made in the bridge member 11, the bearing cap 8 and the cylinder block 1 at a location corresponding to each of the bearing holes 25, 26 and 27 for the balancer shaft 22 with its lower end in communication with the side oil passage 85 and its upper end in communication with corresponding one of the bearing bores 25, 26 and 27.

The oil passage 82 for guiding the lubricating oil from the oil filter 80 downwardly communicates with a middle portion of the oil supply passage 88 at a location which corresponds to the bearing hole 24, so that the lubricating oil from the oil filter 80 is supplied through the oil supply passage 88 into each of the oil passages 83, 84 and 85.

The operation of this embodiment will be described below. The first to fourth wrapping type transmission systems T1 to T4 are driven together by rotation of the crankshaft 9. In the first wrapping type transmission system T1, this causes the valve operating shafts 30 and 31 to be driven at a deceleration ratio of ½ relative to the crankshaft 9 and also causes the water pump 32 to be driven. In the second wrapping type transmission system T2, the both balancer shafts 21 and 22 are driven in opposite directions at a deceleration ratio of 2/1 relative to the crankshaft 9.

Since the first tensioner 46 for adjusting the tension of the first timing belt 36 in the first wrapping type transmission system T1 and the second tensioner 47 for adjusting the tension of the second timing belt 39 in the first wrapping type transmission system T2 are guided by the common support shaft 45, the disposition of the tensioners can be made compact. Moreover, in the first wrapping type transmission system T1, a driving load larger than that in the second wrapping type transmission system T2 is applied, because the valve operating cam shafts 30 and 31 and the water pump 32 requiring a larger driving torque are driven. However, a load applied to the leading end of the support shaft 45 can be reduced to the utmost, because the first tensioner 46 is supported on the support shaft 45 at the axially inner side than the second tensioner 47.

In addition, because the first and second tensioners 46 and 47 are relatively movable in the plane perpendicular to the axis of the support shaft 45, it is possible to increase the freedom of the arrangement of the first and second wrapping type transmission systems T1 and T2 and to separately set the urging forces of the tensioners 46 and 47 on the corresponding timing belts 36 and 39, leading to a stabilized setting of the tensions. Furthermore, by setting the angle formed by the directions of urging by the first and second tensioners 46 and 47 at 90 degrees or more, preferably 120 degrees or more, the directions of loads on the support shaft 45 can be displaced, whereby the full load can be suppressed to a smaller level. This makes it to suppress the load applied to the support shaft 45 to a smaller level conjointly with the disposition of the first and second tensioners 46 and 47.

Moreover, since the second bracket 59 is connected to the outer end of the second tensioner 47 in press contact with the second timing belt 39 of the second wrapping type transmission system T2 disposed at the location remoter from the cylinder block 1 than the first wrapping type transmission system T1, it is unnecessary to provide, between the first and second tensioners 46 and 47, a space permitting the disposition of the second bracket 59 therein, and it is possible to dispose the second wrapping type transmission system T2 in close proximity to the first wrapping type transmission system T1.

Further, because the load on the second wrapping type transmission system T2 is smaller than that on the first wrapping type transmission system T1, it is possible to set the width of the outer wheel 58 in the second tensioner 47 at a smaller level than that of the outer wheel 49 in the first wrapping type transmission system T1. This can contributes to a reduction in amount of support shaft 45 protruded from the cylinder block 1 and a compactness of the entire engine. In addition, since the first bracket 51 is secured to the first inner wheel 48 in such a manner that a portion thereof may be contained and disposed within the first outer wheel 49 in the first tensioner 46, and the second inner wheel 56 is in slide contact with the outer end face of the first inner wheel 48 in such a manner that at least a portion thereof may be inserted into the first outer wheel 49, it is possible to reduce the entire axial lengths of the first and second tensioners 46 and 47, while insuring necessary widths of the first and second timing belts 36 and 39. This also achieves the compactness.

Now, because the outside diameter D1 of the first inner wheel 48 is set larger than the outside diameter D2 of the second inner wheel 56 in the first and second tensioners 46 and 47, it is possible to moderate the increase in surface pressure of abutment between the axially inner end face of the first inner wheel 48 and the washer 97 with an increase in clamping force as result of clamping of the lock nut 66 and to stably support the second inner wheel 56 by the first inner wheel 48 while permitting a relative displacement of the first and second tensioners 46 and 47. Moreover, a larger load is locally applied from the first inner wheel 46 to the cylinder block side by a moment produced by the loads applied from the first and second timing belts 36 and 39 to the tensioners 46 and 47. For this reason, if the first inner wheel 48 is disposed to directly abut against the cylinder block 1 which is made of an aluminum alloy to provide a reduction in weight, it is feared that plastic deformations such as a depression and a fretting occur in the cylinder block 1, resulting in a loosening of the lock nut 66. However, since the washer 97 made of a material having a higher buckling strength is interposed between the first inner wheel 48 and the cylinder block 1, such plastic deformations of the cylinder block 1 can be prevented and hence, the lock nut 66 cannot be loosened.

It should be noted that the travelling speed of the second timing belt 39 in the second wrapping type transmission system T2 is larger than that of the first timing belt 36 in the first wrapping type transmission system T1 (about two times). Nevertheless, in the first and second tensioners 46 and 47, the ratio of the outside diameter D4 of the second outer wheel 58 to the outside diameter D2 of the second inner wheel 56 is set larger than the ratio of the outside diameter D3 of the first outer wheel 49 to the outside diameter D1 of the first inner wheel 48 (D4/D2>D3/D1). Particularly, the outside diameter D3 of the first outer wheel 49 is set smaller than the outside diameter D4 of the second outer wheel 58, and the diameter D5 of the phantom circle of the first balls 50 is set larger than the diameter D6 of the phantom circle of the second balls 57. Therefore, despite a higher travelling speed of the second timing belt 39, the rotational speed of the second outer wheel 58 can be suppressed, and the second balls 57 can be arranged compactly to improve the durability.

Since the support shaft 45 which guides the first and second tensioners 46 and 47 is threadedly fitted in the cylinder block 1 so that the flange portion 5d provided at its middle portion abuts against the outer surface 1c of the side wall, there is no inclination of its axis after it has been once attached, and even when the lock nut 66 is clamped again after the latter has been loosened to adjust the first and second tensioners 46 and 47, they cannot be inclined, enabling a stabilized setting of the tension. Moreover, there is no fear of loosening of the first threaded portion 45a when the lock nut 55 is loosened, because the first threaded portion 45a screwed in the cylinder block 1 is larger in diameter than that of the second threaded portion 45c over which the lock nut 66 is threadedly fitted. Since the threaded bore 95 into which the support shaft 45 is screwed leads to the water jacket 94, the support shaft 45 can be cooled by the water in the water jacket 94, and the first and second tensioners 46 and 47 can be also cooled efficiently by the water. Additionally, since the lock nut 66 can be operated outside the side cover 65, it is possible to extremely easily adjust the tension by the first and second tensioners 46 and 47.

Further, the first tensioner 46 can be fixed by clamping the temporarily clamping nut 100 during assembling of the first and second tensioners 46 and 47. Therefore, it is unnecessary to concurrently assemble the both tensioners 46 and 47, and after the first tensioner 46 has been assembled and temporarily fixed, the second tensioner 47 can be assembled, leading to an improved assembling operation. Thus, after the completion of assembling of the second tensioner 47, the temporarily clamping nut 100 may be removed, and the lock nut 66 may be loosed, whereby the tensioners 46 and 47 repulsively come into press contact with the first and second timing belts 36 and 39.

Figure 12:
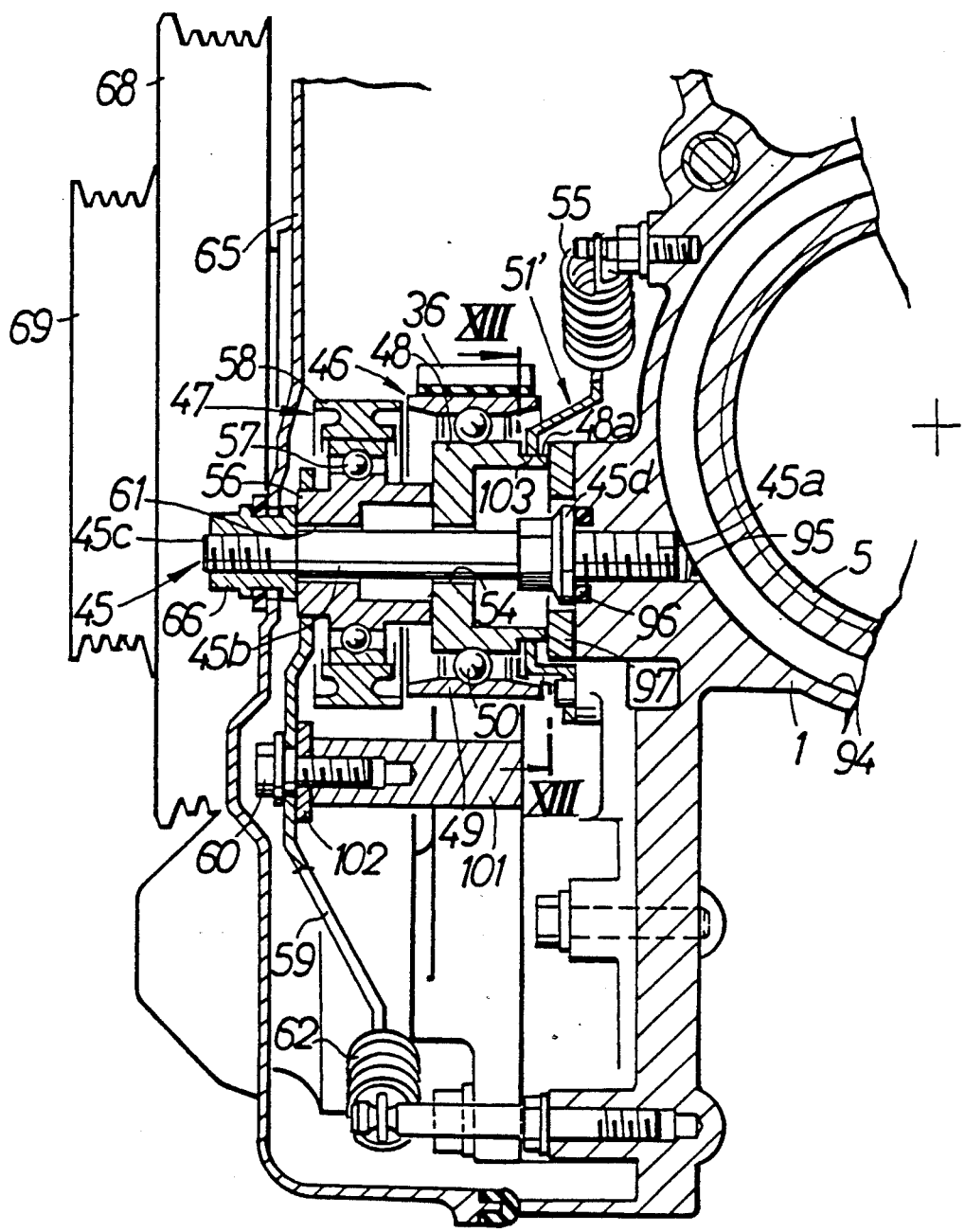
FIGS. 12 and 13 illustrate a second embodiment of the present invention, FIG. 11 being a cross-sectional plan view similar to FIG. 9, and FIG. 13 being a sectional view taken along a line XIII—XIII in FIG. 12.
Figure 13:
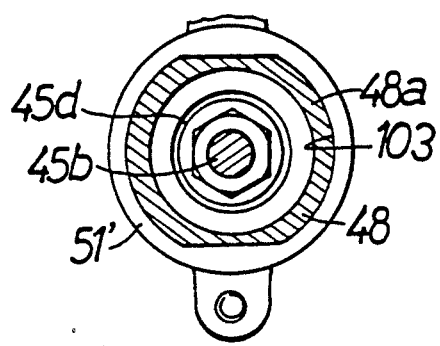

FIGS. 12 and 13 illustrate a second embodiment of the present invention, wherein portions corresponding to those in the above-described first embodiment are designated by the same reference characters.

On its outer surface closer to the cylinder block 1, the first inner wheel 48 in the first tensioner 46 is provided with a fitting portion 48a which is formed into a sectional shape other than a circle, e.g., an elliptic or oval shape, and a first bracket 51' for supporting the first tensioner 46 is provided with a fitting bore 103 which is fittable with the fitting portion 48a.

With such a construction, as compared with the previously-described first embodiment wherein the first bracket 51 has been press-fitted into the secured in the first inner wheel 48, the axial length of the first inner wheel 48 required for connection with the first bracket 51' can be shortened, and the first and second tensioners 46 and 47 can be disposed correspondingly in proximity to the cylinder block 1, contributing to the compactness.

Figure 14:
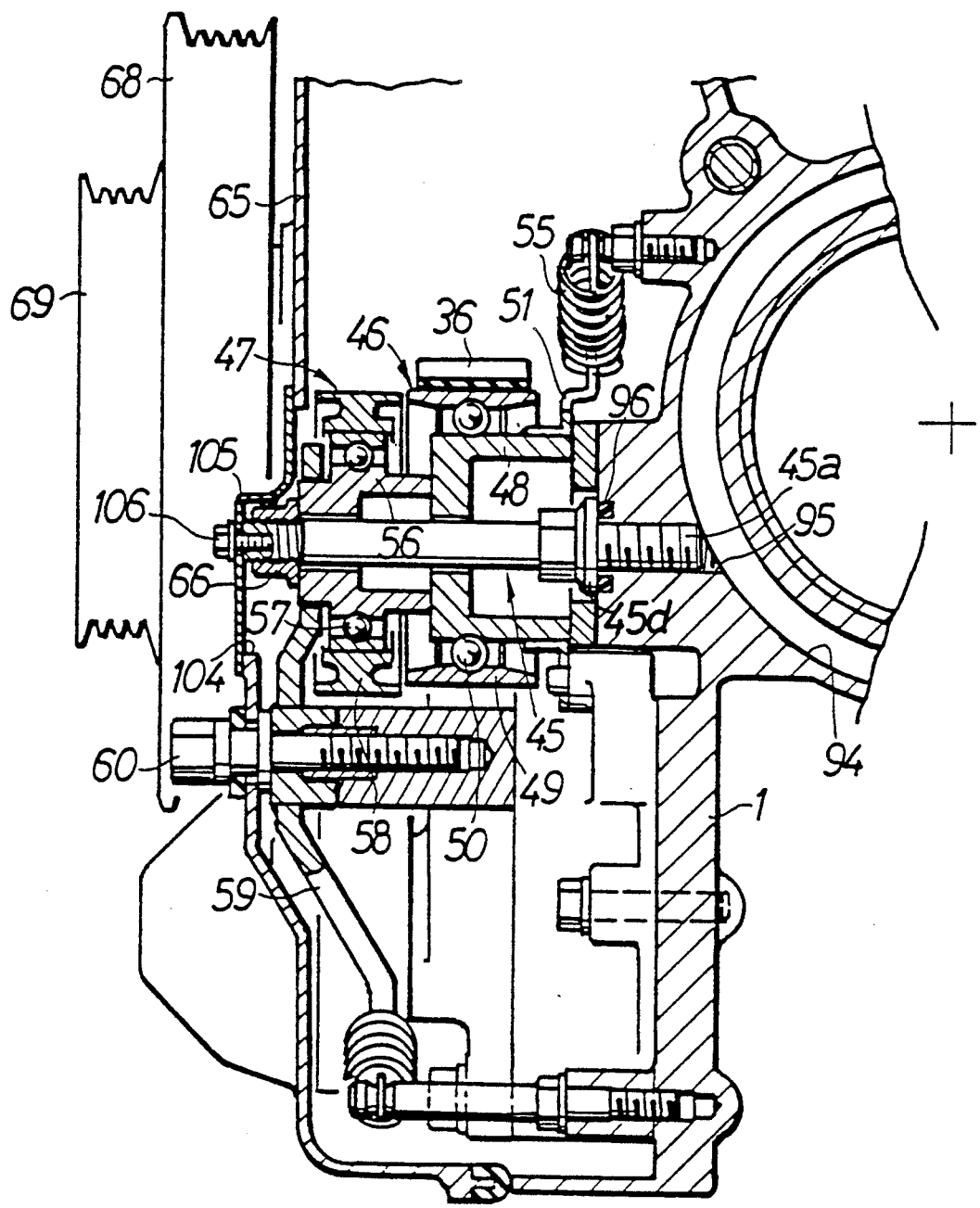
FIG. 14 is a cross-sectional plan view similar to FIG. 9, but illustrating a third embodiment of the present invention.

FIG. 14 illustrates a third embodiment of the present invention, wherein portions corresponding to those in the previous embodiments are denoted by the same reference characters.

An opening 104 for a maintenance is provided in the side cover 65 at a location corresponding to the first and second tensioners 46 and 47, and a cover 105 for a maintenance and for closing the opening 104 is detachably attached to the leading end of the support shaft 45 by a threaded member 106.

With the third embodiment, the first and second tensioners 46 and 47 can be visually checked only by removing the cover 105 for the maintenance without removal of the entire side cover 65, and the closing state of the cover 105 for the maintenance can be reliably maintained by attachment to the support shaft 45 having a larger rigidity rather than the side cover 65 having a smaller rigidity.

Figure 15:
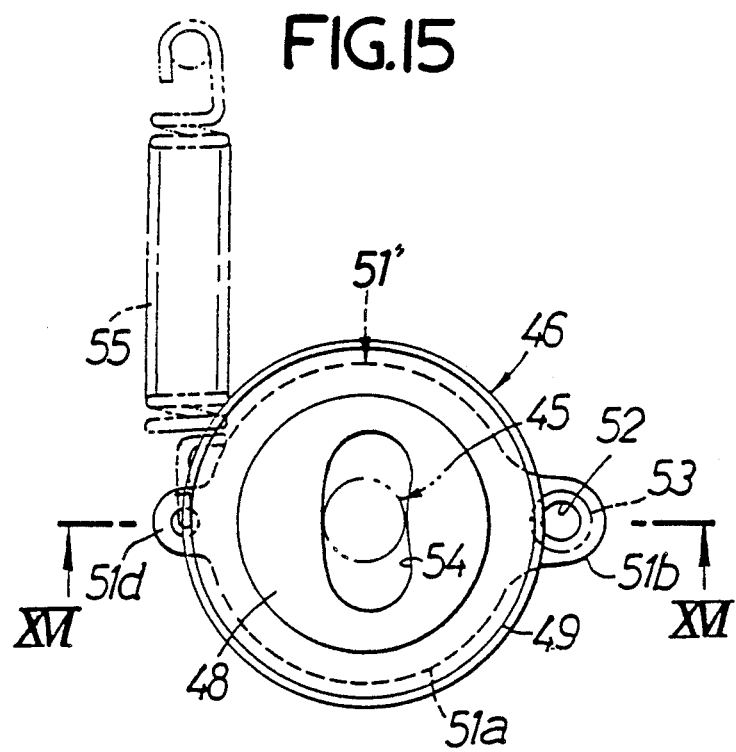
FIGS. 15 and 16 illustrate a fourth embodiment of the present invention, FIG. 15 being a plan view similar to FIG. 10, and FIG. 16 being a sectional view taken along a line XVI—XVI in FIG. 15.
Figure 16:
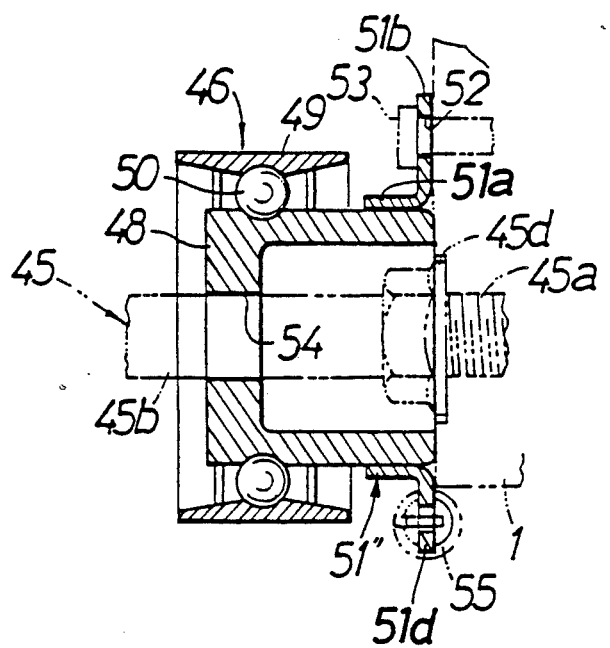

FIGS. 15 and 16 illustrate a fourth embodiment of the present invention, wherein in place of the arm portion 51c having the long temporarily clamping bore 98 as shown in FIGS. 10 and 11 in the first embodiment, the first tensioner 46 may be swingably supported by a first bracket 51'' including a projection 51d connected to a first tension spring 55.

What is claimed is:

1. A wrapping type transmission structure for an internal combustion engine, comprising a first wrapping type transmission system which includes a first tensioner urged into press contact with a first endless power-transmitting belt and which is disposed on a side wall of an engine body, and a second wrapping type transmission system which includes a second tensioner urged into press contact with a second endless power-transmitting belt and which is disposed at a location remoter from the engine body than the first wrapping type transmission system, said structure further comprising a support shaft fixed to the engine body and inserted through the first and second tensioners which are relatively movable in a plane perpendicular to an axis of said support shaft, while permitting movements of the individual tensioners in directions of press contact with the first and second transmitting belts.

2. A wrapping type transmission structure for an internal combustion engine according to claim 1, wherein an angle formed by the direction of urging the first tensioner into press contact with the first transmitting belt and by the direction of urging the second tensioner into press contact with the second transmitting belt is set at not less than 90 degrees.

3. A wrapping type transmission structure for an internal combustion engine according to claim 1, further comprising a crankshaft, a valve operating shaft and a balancer shaft which are rotatably carried on the engine body with axes thereof being arranged in parallel to each other, said first wrapping type transmission system being arranged to transmit a power between said crankshaft and said valve operating cam shaft, said second wrapping type transmission system being arranged to transmit a power between said crankshaft and said balancer shaft.

4. A wrapping type transmission structure for an internal combustion engine according to claim 1, wherein said first and second wrapping type transmission systems are covered by a side cover mounted to the engine body, and a maintenance cover is detachably mounted to a tip end of the support shaft by a threaded member for covering an opening for maintenance which is provided in the side cover at a location corresponding to the first and second tensioners.

5. A wrapping type transmission structure for an internal combustion engine, comprising a first wrapping type transmission system which includes a first tensioner urged into press contact with a first endless power-transmitting belt and which is disposed on a side wall of an engine body, and a second wrapping type transmission system which includes a second tensioner urged into press contact with a second endless power-transmitting belt and which is disposed at a location remoter from the engine body than the first wrapping type transmission system, said first and second tensioners respectively comprising a first and a second outer wheel in press contact with the first and second transmitting belts, and a first and a second inner wheel disposed coaxially with the corresponding outer wheels with a plurality of first and second rolling elements being interposed therebetween, said structure further comprising a support shaft mounted to the engine body and inserted through said first and second inner wheels while permitting movements of said first and second tensioners in directions of press contact with said first and second transmitting belts, with an axially outer end face of said first inner wheel and an axially inner end face of said second inner wheel abutting against each other for relative sliding movement, and a lock nut threadedly fitted over a tip end of said support shaft projected from the second inner wheel and abutted against an axially outer end face of the second inner wheel.

6. A wrapping type transmission structure for an internal combustion engine according to claim 5, wherein an outside diameter of said first inner wheel is set larger than that of said second inner wheel.

7. A wrapping type transmission structure for an internal combustion engine according to claim 5, wherein a ratio of an outside diameter of said second outer wheel to an outside diameter of said second inner wheel in said second tensioner is set larger than a ratio of an outside diameter of said first outer wheel to an outside diameter of said first inner wheel in said first tensioner.

8. A wrapping type transmission structure for an internal combustion engine according to claim 7, wherein the outside diameter of said first outer wheel is set smaller than that of said second outer wheel, and a diameter of a phantom circle defined by arrangement of the first rolling elements is set larger than that of a phantom circle defined by arrangement of the second rolling elements.

9. A wrapping type transmission structure for an internal combustion engine according to claim 5, wherein a base end of the support shaft is threadedly fitted in the engine body, and a diameter of a first threaded portion provided at the base end of said support shaft for threaded fitting to the engine body is set larger than that of a second threaded portion which is provided at the tip end of said support shaft to be threadedly fitted with the lock nut.

10. A wrapping type transmission structure for an internal combustion engine according to claim 9, wherein said support shaft is provided at a location closer to the base end thereof with a flange portion projected radially outwardly for abutment against the engine body.

11. A wrapping type transmission structure for an internal combustion engine according to claim 10, wherein the engine body is provided with a threaded bore into which the base end of said support shaft is threadedly fitted and which is communicated with an interior of a water jacket provided in the engine body, said support shaft being threadedly fitted in said threaded bore with a sealing member interposed between said support shaft and said engine body.

12. A wrapping type transmission structure for an internal combustion engine according to claim 5, wherein the first inner wheel of said first tensioner is secured to a first bracket swingably carried on the engine body, and the second inner wheel of said second tensioner is secured to a second bracket swingably carried on the engine body.

13. A wrapping type transmission structure for an internal combustion engine according to claim 12, wherein said first bracket has a long temporarily clamping bore provided therein along an arc with a center located at a fulcrum of swinging movement of the first bracket, and said engine body has a threaded shaft disposed therein to project outwardly through said long temporarily clamping bore, so that a temporarily clamping nut is threadedly fitted over said threaded shaft to fix said first bracket to said engine body.

14. A wrapping type transmission structure for an internal combustion engine according to claim 12, wherein said first and second tensioners are disposed at locations outside said first and second transmitting belts so as to press contact with said transmitting belts to inwardly urge the belts from an outside, and said second bracket is disposed at a location outside and clear of said first and second transmitting belts.

15. A wrapping type transmission structure for an internal combustion engine according to claim 12, wherein said first bracket is secured to said first inner wheel with at least a portion of the first bracket being inserted into said first outer wheel.

16. A wrapping type transmission structure for an internal combustion engine according to claim 12, wherein said second inner wheel is connected, at an outermost end thereof in an axial direction of the support shaft, to said second bracket.

17. A wrapping type transmission structure for an internal combustion engine according to claim 5, wherein the outer end of said first inner wheel of said first tensioner is disposed at an axially inner location than the outer end of said first outer wheel, and said second inner wheel of said second tensioner abuts against the outer end face of said first inner wheel for relative sliding movement therebetween with at least a portion of the second inner wheel being contained in said first outer wheel.

18. A wrapping type transmission structure for an internal combustion engine according to claim 5, further including a washer interposed between the axially inner end face of said first inner wheel and said engine body, said washer being made of a material having a higher buckling strength than that of a material forming the engine body.

19. A wrapping type transmission structure for an internal combustion engine according to claim 5, wherein said first and second wrapping type transmission systems are covered by a side cover mounted to said engine body, with at least an operating portion of said lock nut being projected outwardly from said side cover.

20. A wrapping type transmission structure for an internal combustion engine, comprising a first wrapping type transmission system which includes a first tensioner urged into press contact with a first endless power-transmitting belt and which is disposed on a side wall of an engine body, and a second wrapping type transmission system which includes a second tensioner urged into press contact with a second endless power-transmitting belt and which is disposed at a location remoter from the engine body than the first wrapping type transmission system, said structure further comprising a support shaft fixed to the engine body, said support shaft being inserted through the first and second tensioners which are relatively movable in a plane perpendicular to an axis of said support shaft and are disposed with at least portions thereof placed one on the other in an axial direction of the support shaft, while permitting movements of the individual tensioners in directions to come into press contact with the first and second transmitting belts.

* * * * *